United States Patent
Kato et al.

(10) Patent No.: US 12,485,603 B2
(45) Date of Patent: Dec. 2, 2025

(54) STRETCHING MACHINE AND RAIL FOR STRETCHING MACHINE

(71) Applicant: THE JAPAN STEEL WORKS, LTD., Tokyo (JP)

(72) Inventors: Masaki Kato, Tokyo (JP); Ichiro Nakajima, Tokyo (JP); Naoaki Yoshimatsu, Tokyo (JP); Tatsuya Hirano, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 18/860,643

(22) PCT Filed: Jan. 11, 2023

(86) PCT No.: PCT/JP2023/000496
§ 371 (c)(1),
(2) Date: Oct. 26, 2024

(87) PCT Pub. No.: WO2023/210066
PCT Pub. Date: Nov. 2, 2023

(65) Prior Publication Data
US 2025/0289174 A1 Sep. 18, 2025

(30) Foreign Application Priority Data
Apr. 26, 2022 (JP) .................. 2022-072323

(51) Int. Cl.
*B29C 55/16* (2006.01)
*B29C 48/00* (2019.01)
(Continued)

(52) U.S. Cl.
CPC ........ *B29C 55/165* (2013.01); *B29C 48/0018* (2019.02); *B29C 55/20* (2013.01);
(Continued)

(58) Field of Classification Search
CPC ......... B29C 55/20; B29C 55/02; B29C 55/08; B29C 55/165; B29C 55/26
See application file for complete search history.

(56) References Cited

U.S. PATENT DOCUMENTS 3,014,234 A * 12/1961 Koppehele .............. B29C 55/20
26/72
4,821,935 A * 4/1989 Caroselli ................ B65H 20/16
226/91
(Continued)

FOREIGN PATENT DOCUMENTS

JP          4379306 B2    12/2009
JP       2013-144425 A     7/2013
(Continued)

OTHER PUBLICATIONS

International Search Report for International Patent Application No. PCT/JP2023/000496, Mar. 28, 2023.

*Primary Examiner* — Jillian K Pierorazio
(74) *Attorney, Agent, or Firm* — Potomac Law Group, PLLC

(57) ABSTRACT

A stretching machine configured to stretch a resin film includes a plurality of link mechanisms coupled to constitute an endless chain and a rail 14 on which the link mechanisms run. The rail 14 of the stretching machine has a slit 146 in a side surface 142a. The slit 146 extends in a direction inclined with respect to a direction in which the rail 14 extends.

14 Claims, 12 Drawing Sheets

(51) Int. Cl.
*B29C 55/20* (2006.01)
*B29C 48/08* (2019.01)
*B29C 48/28* (2019.01)
*B29C 48/305* (2019.01)
*B29C 48/88* (2019.01)

(52) U.S. Cl.
CPC .............. *B29C 48/08* (2019.02); *B29C 48/28* (2019.02); *B29C 48/305* (2019.02); *B29C 48/9135* (2019.02)

(56) References Cited

U.S. PATENT DOCUMENTS 7,749,411 B2 * 7/2010 Nagashima .............. B29D 7/01
264/2.7
2014/0013612 A1 * 1/2014 Lee .......................... B29C 55/08
264/165

FOREIGN PATENT DOCUMENTS

| JP | 2015112852 A | * | 6/2015 | .......... B29C 55/026 |
| JP | 2016-132152 A | | 7/2016 | |
| JP | 2022051372 A | * | 3/2022 | |

\* cited by examiner

14: RAIL
142a: SIDE SURFACE
146: SLIT

STRETCHING MACHINE AND RAIL FOR STRETCHING MACHINE

TECHNICAL FIELD

The present invention relates to a stretching machine and a rail for a stretching machine.

BACKGROUND ART

A stretching machine configured to stretch a sheet, a film, or the like in a longitudinal direction and a transverse direction while conveying it has been known. For example, Patent Document 1 discloses a simultaneous biaxial stretching machine in which longitudinal stretching and transverse stretching of a sheet-like material are performed simultaneously. The simultaneous biaxial stretching machine disclosed in Patent Document 1 includes an endless link device, and the endless link device includes equal-length link units (link mechanisms) formed like a folding scale.

The equal-length link unit disclosed in Patent Document 1 includes a plurality of rollers that are rotatably supported by bearings and move on rails while rotating.

RELATED ART DOCUMENTS

Patent Documents

Patent Document 1: Japanese Patent No. 4379306

SUMMARY OF THE INVENTION

Problems to be Solved by the Invention

In a case where a link device moves on a rail having a slit formed therein, vibrations occur when a guide roller passes over the slit, and the high-speed movement of the link device is obstructed.

Other objects and novel features will be apparent from the description of this specification and the accompanying drawings.

Means for Solving the Problems

A rail of a stretching machine according to an embodiment has a slit in a side surface. The slit extends in a direction inclined with respect to a direction in which the rail extends.

Effects of the Invention

According to the embodiment, the high-speed movement of the link device can be achieved.

BRIEF DESCRIPTIONS OF THE DRAWINGS

DETAILED DESCRIPTION OF PREFERRED EMBODIMENTS

Figure 1:
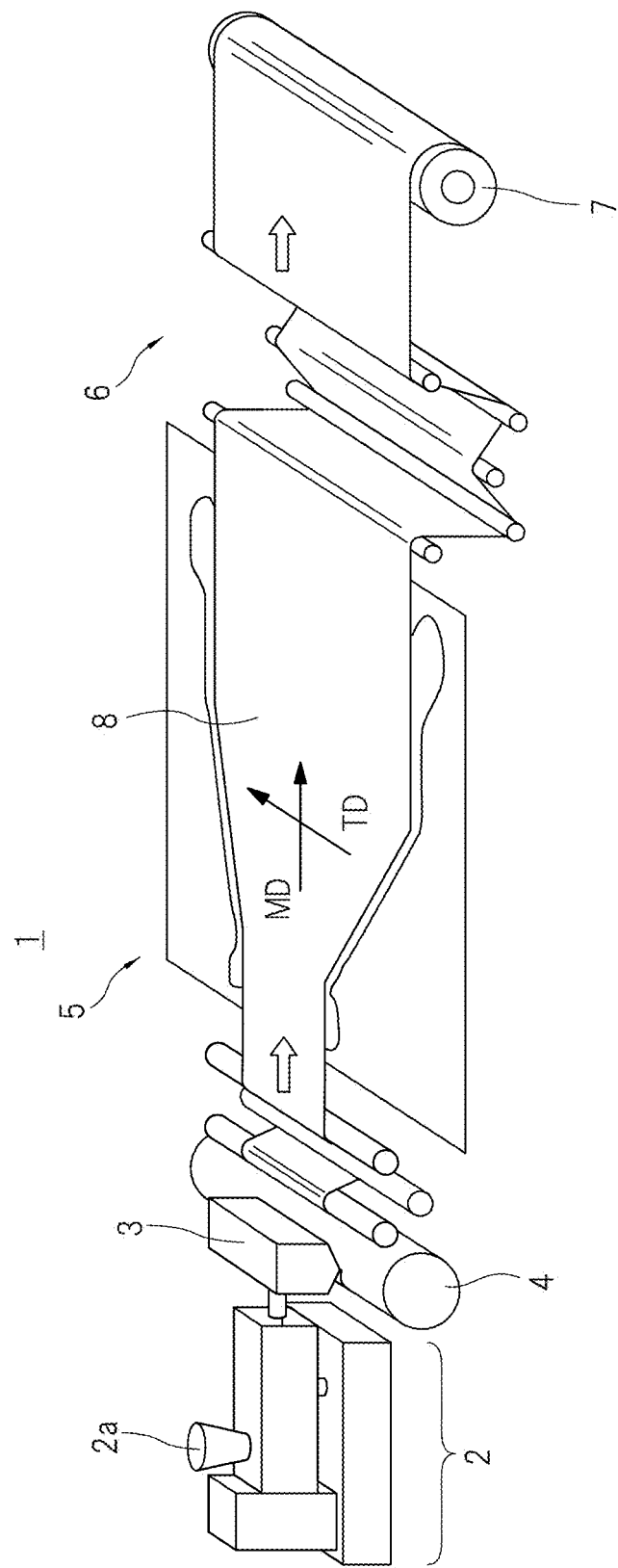
FIG. 1 is a schematic view showing a thin-film manufacturing system.

Hereinafter, an embodiment will be described in detail with reference to the drawings. Note that the members having the same or substantially same function are denoted by the same reference characters throughout the drawings for describing the embodiment, and the repetitive description thereof will be omitted.

Configuration of Manufacturing System

FIG. 1 is a schematic view showing a thin-film manufacturing system including a stretching machine. A thin-film manufacturing system 1 shown in FIG. 1 includes an extrusion apparatus (extruder, kneading extruder) 2, a T-die 3, a raw sheet cooling apparatus 4, a stretching machine 5, a take-off apparatus 6, and a winder apparatus 7.

In the thin-film manufacturing system 1, a thin film is manufactured through the following process. First, a raw material is supplied to a material supply unit (material supply port, hopper) 2a of the extrusion apparatus 2. The raw material to be supplied to the extrusion apparatus 2 contains a resin material (for example, thermoplastic resin material in pellet shape), additives, and the like. The raw material supplied to the extrusion apparatus 2 is conveyed while being kneaded (mixed). Specifically, the raw material supplied to the extrusion apparatus 2 is melted and kneaded while being sent forward by the rotation of a screw in the extrusion apparatus 2. The raw material kneaded by the extrusion apparatus 2 (kneaded material) is supplied to the T-die 3. The kneaded material supplied to the T-die 3 is extruded toward the raw sheet cooling apparatus 4 through a slit of the T-die 3. The kneaded material supplied from the extrusion apparatus 2 to the T-die 3 is formed into a predetermined shape (in this case, film-like shape) by passing through the T-die 3.

The kneaded material extruded from the T-die 3 is cooled to be a film 8 in the raw sheet cooling apparatus 4. The film 8 is a resin film in a solidified state (solid state). More specifically, the film 8 is a thermoplastic resin film. The film 8 is continuously extruded from the T-die 3. As a result, the film 8 is continuously supplied to the stretching machine 5.

The film 8 supplied to the stretching machine 5 is stretched in an MD direction and a TD direction by the stretching machine 5. The film 8 subjected to a stretching process (stretching treatment) by the stretching machine 5 is conveyed to the winder apparatus 7 via the take-off apparatus 6 and is wound by the winder apparatus 7. The film 8 wound by the winder apparatus 7 is cut as needed.

The thin-film manufacturing system 1 shown in FIG. 1 manufactures a thin film through the process described above. Understandably, the thin-film manufacturing system 1 can be modified in various ways in accordance with the properties and the like of the thin film to be manufactured. For example, an extraction tank may be provided near the take-off apparatus 6 shown in FIG. 1, and a plasticizer (for example, paraffin) contained in the film 8 may be removed in some cases.

The stretching machine 5 constituting the thin-film manufacturing system 1 stretches the film 8 in the MD direction and the TD direction while conveying the film 8 in the MD direction. In other words, the MD (Machine Direction) direction is a conveying direction of the film 8. Also, the TD (Transverse Direction) direction is a direction that intersects the conveying direction of the film 8. Thus, in the following description, the MD direction is referred to as a "conveying direction" or a "longitudinal direction", and the TD direction is referred to as a "transverse direction" in some cases. The MD direction (conveying direction, longitudinal direction) and the TD direction (transverse direction) are the directions intersecting each other, and are more specifically the directions perpendicular to each other. Namely, the stretching machine 5 shown in FIG. 1 is a stretching machine capable of simultaneously stretching the film 8 in two directions intersecting each other while conveying the film 8, and is referred to as a "simultaneous biaxial stretching machine" in general.

Stretching Machine

Figure 2:
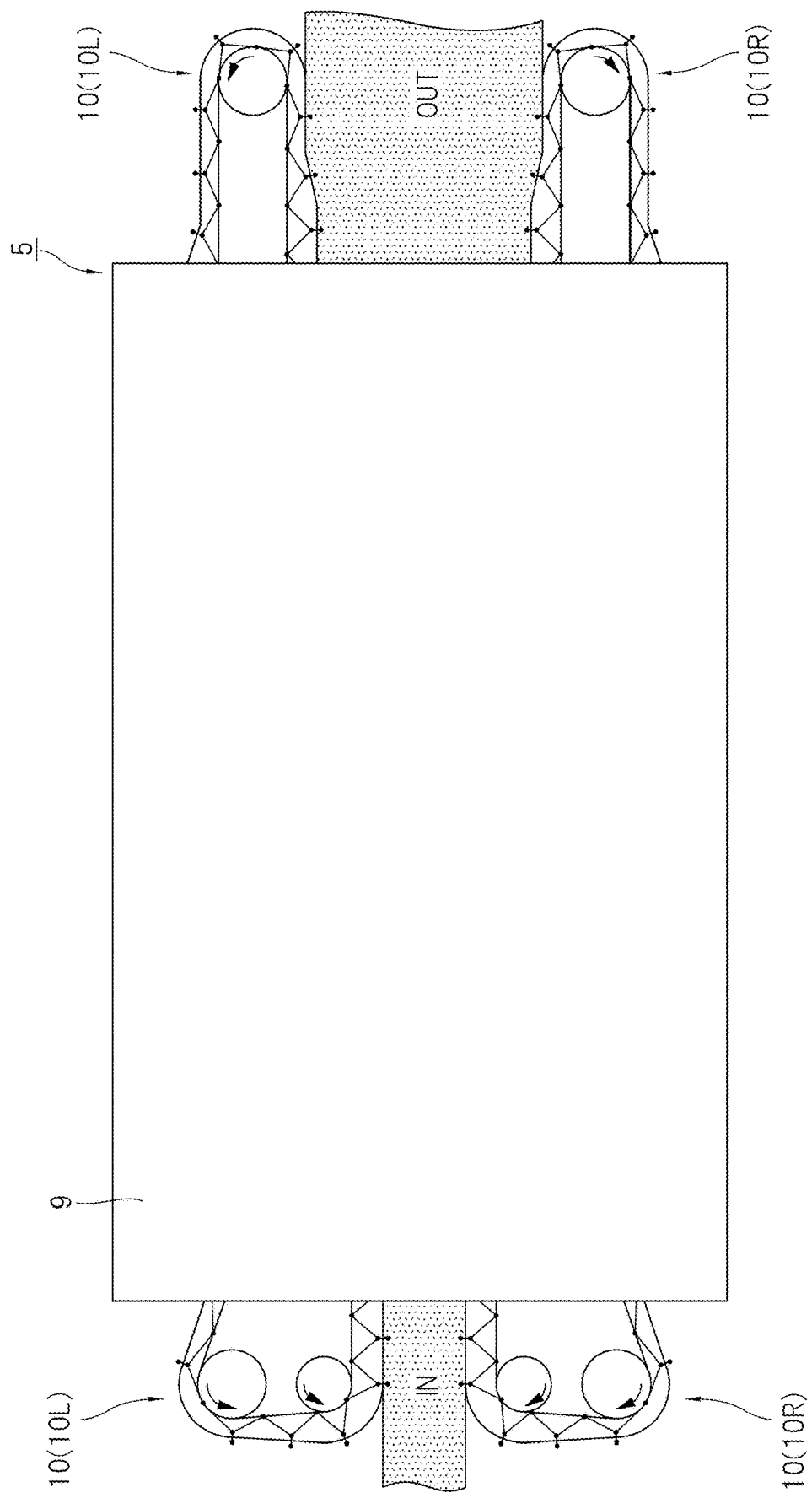
FIG. 2 is a plan view schematically showing a structure of a stretching machine.
Figure 3:
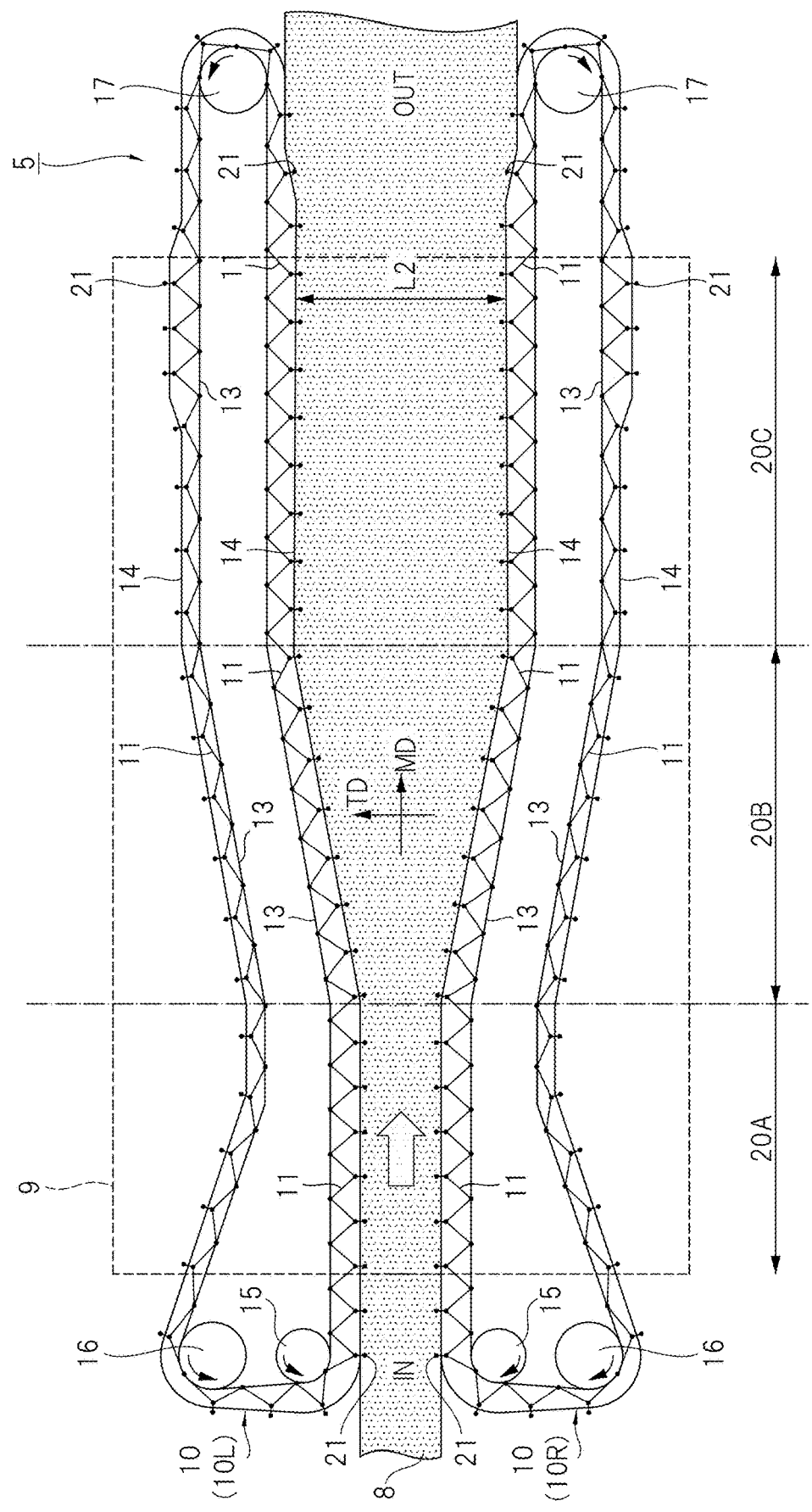
FIG. 3 is another plan view schematically showing the structure of the stretching machine.

FIG. 2 and FIG. 3 are plan views schematically showing the structure of the stretching machine. The stretching machine 5 has a pair of link devices 10. The pair of link devices 10 are separated from each other in plan view. In the following description, one of the pair of link devices 10 is referred to as a "link device 10R", and the other of the pair of link devices 10 is referred to as a "link device 10L" in some cases.

In FIG. 2 and FIG. 3, the link device 10R is disposed on a right side (R side) with respect to the conveying direction (MD direction), and the link device 10L is disposed on a left side (L side) with respect to the conveying direction (MD direction). The link device 10R and the link device 10L are separated from each other in the TD direction and face each other in the TD direction with the film 8 interposed therebetween. The film 8 is conveyed through the space between the link device 10R and the link device 10L in the MD direction. In other words, the space between the link device 10R and the link device 10L facing each other functions as a conveyance path for conveying the film 8.

Referring to FIG. 3, the stretching machine 5 is divided into three regions 20A, 20B, and 20C along the conveying direction (MD direction). The region 20A serves as a preheating region, the region 20B serves as a stretching region, and the region 20C serves as a heat setting region. The regions 20A, 20B, and 20C are arranged in this order in the conveying direction (MD direction).

The inlet of the film 8 in the stretching machine 5 (portion indicated by "IN" in FIG. 2 and FIG. 3) is present in the region 20A. Also, the outlet of the film 8 in the stretching machine 5 (portion indicated by "OUT" in FIG. 2 and FIG. 3) is present in the region 20C. Further, the region 20B in which the stretching process is performed is present between the region 20A in which the inlet of the film 8 is present and the region 20C in which the outlet of the film 8 is present.

A heat treatment unit 9 covers a part of the region 20A, all of the region 20B, and a part of the region 20C. Also, the heat treatment unit 9 covers the central parts of the link devices 10R and 10L, and heats the film 8 conveyed by the link devices 10R and 10L. The heat treatment unit 9 in this embodiment is composed of an oven capable of heating the film 8 to a desired temperature. The film 8 passes through the inside of the oven as the heat treatment unit 9 while being gripped by the link devices 10R and 10L.

Link Device

Each of the link devices 10R and 10L includes a plurality of link mechanisms 11 coupled to constitute an endless chain, and each of the link mechanisms 11 has a clip 21 which is a jig for gripping the film 8. The film 8 is held by the clips 21 in the link mechanisms 11 constituting the link device 10R and the clips 21 in the link mechanisms 11 constituting the link device 10L. Namely, one side (R side/right side) of the film 8 is gripped by the plurality of clips 21 in the link device 10R, and the other side (L side/left side) of the film 8 is gripped by the plurality of clips 21 in the link device 10L.

Figure 9:
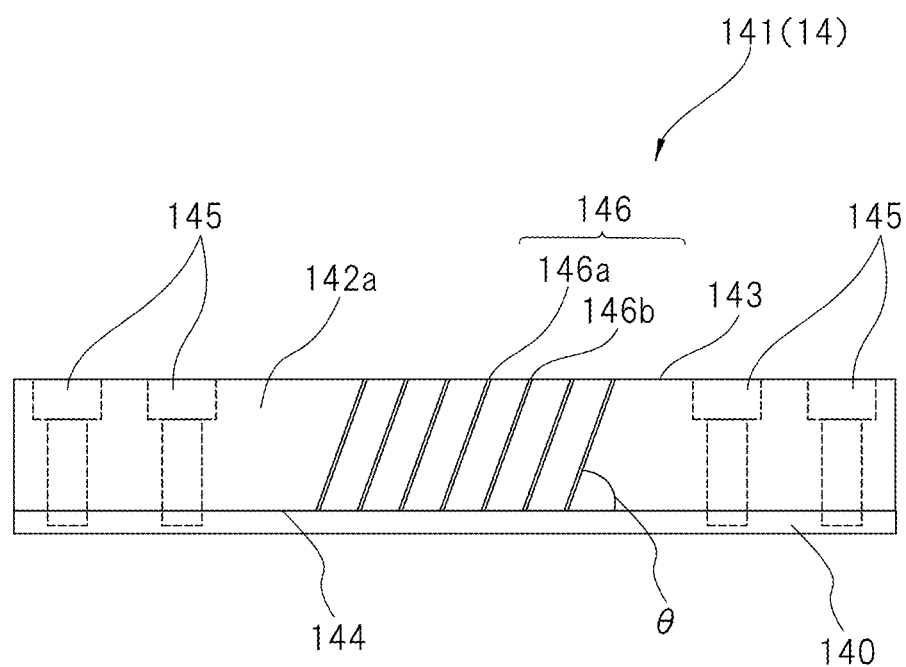
FIG. 9 is a side view of the rail.

The link mechanisms 11 in the link devices 10R and 10L run on rails 13 and 14 which are a pair of rails for a stretching machine disposed on a support table (bed) 140 (see FIG. 9). The rail 14 is disposed outside the rail 13 and surrounds the rail 13. From another viewpoint, the rail 13 is disposed inside the rail 14 and is surrounded by the rail 14.

The rails 13 and 14 are annularly disposed over the regions 20A, 20B, and 20C. More specifically, the rails 13 and 14 are annularly disposed over the regions 20A, 20B, and 20C so as to be turned back in the region 20A where the inlet of the film 8 is present and turned back in the region 20C where the outlet of the film 8 is present.

The link device 10R has three sprockets 15, 16, and 17 disposed inside the rail 13. Similarly, the link device 10L has three sprockets 15, 16, and 17 disposed inside the rail 13. The sprockets 15 and 16 of each of the link devices 10R and 10L are disposed in the region 20A, and the sprocket 17 of each of the link devices 10R and 10L is disposed in the region 20C. Understandably, the sprockets 15 and 16 are disposed outside the heat treatment unit 9 that covers a part of the region 20A. Further, the sprockets 17 are disposed outside the heat treatment unit 9 that covers a part of the region 20C. Namely, the sprockets 15, 16, and 17 of each of the link devices 10R and 10L are disposed outside the oven as the heat treatment unit 9.

The plurality of link mechanisms 11 in the link devices 10R and 10L are disposed on the rails 13 and 14 in a state of being movable along the rails 13 and 14. The sprockets 15, 16, and 17 of the link device 10R engage with the plurality of link mechanisms 11 of the link device 10R. Therefore, when the sprockets 15, 16, and 17 rotate, a driving force acts on the plurality of link mechanisms 11 of the link device 10R, and the link mechanisms 11 move (run) along the rails 13 and 14.

The sprockets 15, 16, and 17 of the link device 10L engage with the plurality of link mechanisms 11 of the link device 10L. Therefore, when the sprockets 15, 16, and 17 rotate, a driving force acts on the plurality of link mechanisms 11 of the link device 10L, and the link mechanisms 11 move (run) along the rails 13 and 14.

Namely, the rails 13 and 14 are guide rails for moving (running) the plurality of link mechanisms 11 in a predetermined direction. Each of the rails 13 and 14 is formed by connecting a plurality of partial rails which will be described later in detail.

In the following description, for each of the link devices 10R and 10L shown in FIG. 3, the side facing the film 8 is referred to as a "film side", and the side opposite to the film side is referred to as a "return side" in some cases. Namely, the side on which the plurality of link mechanisms 11 move from the inlet (IN) toward the outlet (OUT) while the clips 21 are gripping the film 8 is the film side. Also, the side which is located on the opposite side of the film side and on which the plurality of link mechanisms 11 move from the outlet (OUT) toward the inlet (IN) while the clips 21 do not grip the film 8 is the return side.

An interval between adjacent link mechanisms 11 (referred to also as "link pitch" in some cases) of the plurality of link mechanisms 11 changes in accordance with an interval (separation distance) between the rail 13 and the rail 14. In other words, the interval between the adjacent link mechanisms 11 can be adjusted by adjusting the separation distance between the rail 13 and the rail 14.

Figure 4A:
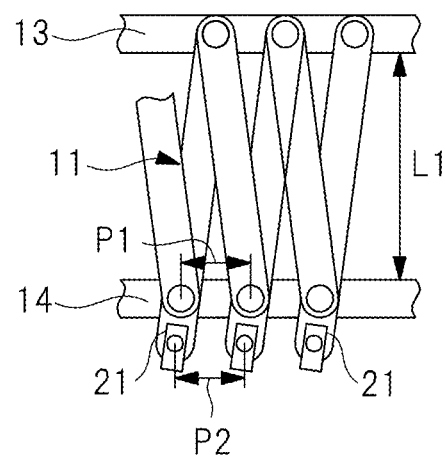
FIG. 4A is a plan view schematically showing link mechanisms and rails.
Figure 4B:
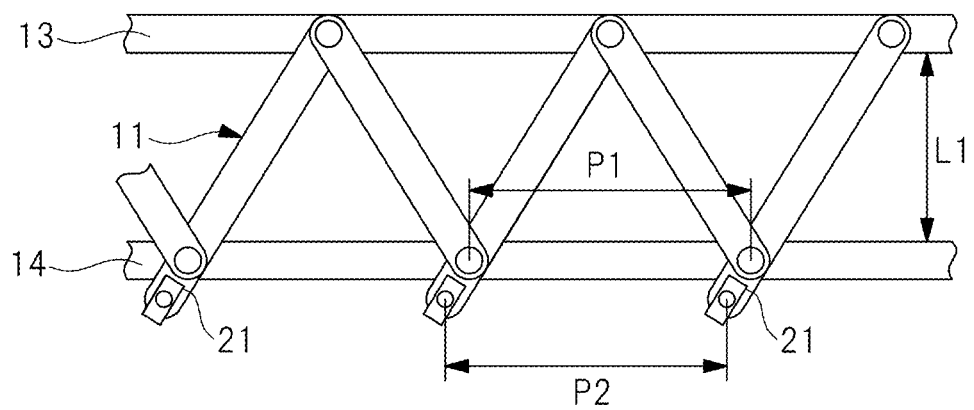
FIG. 4B is another plan view schematically showing the link mechanisms and the rails.

FIG. 4A and FIG. 4B are plan views schematically showing the link mechanisms and the rails shown in FIG. 3. As shown in FIG. 4A and FIG. 4B, the angle formed by the adjacent link mechanisms 11 becomes larger and the pitch P1 between the adjacent link mechanisms 11 becomes larger as the separation distance L1 between the rails 13 and 14 becomes smaller. On the other hand, the angle formed by the adjacent link mechanisms 11 becomes smaller and the pitch P1 between the adjacent link mechanisms 11 becomes smaller as the separation distance L1 between the rails 13 and 14 becomes larger.

As described above, each link mechanism 11 has the clip 21 configured to grip the film 8. Therefore, the pitch P2 between the adjacent clips 21 also increases and decreases in accordance with the increase and decrease of the pitch P1 between the adjacent link mechanisms 11. Specifically, the pitch P1 between the link mechanisms 11 increases when the separation distance L1 between the rails 13 and 14 decreases, and the pitch P2 between the clips 21 also increases when the pitch P1 between the link mechanisms 11 increases (FIG. 4A→FIG. 4B). On the other hand, the pitch P1 between the link mechanisms 11 decreases when the separation distance L1 between the rails 13 and 14 increases, and the pitch P2 between the clips 21 also decreases when the pitch P1 between the link mechanisms 11 decreases (FIG. 4B→FIG. 4A).

Since each of the plurality of link mechanisms 11 includes the clip 21, the pitch P1 between the two adjacent link mechanisms 11 and the pitch P2 between the two clips 21 provided in these link mechanisms 11 are the same. Namely, P1=P2 holds in each of FIG. 4A and FIG. 4B.

Operation of Stretching Machine (Simultaneous Biaxial Stretching Machine)

The film 8 supplied from the raw sheet cooling apparatus 4 to the stretching machine 5 is gripped by the link devices 10R and 10L at the inlet of the stretching machine 5. Specifically, the film 8 is gripped by the clips 21 in the link mechanisms 11 of the link devices 10R and 10L shown in FIG. 2 and FIG. 3. More specifically, one side of the film 8 in the width direction is gripped by the clips 21 in the link mechanisms 11 of the link device 10R, and the other side of the film 8 in the width direction is gripped by the clips 21 in the link mechanisms 11 of the link device 10L.

The film 8 whose both sides in the width direction are gripped by the clips 21 is conveyed from the inlet to the outlet of the stretching machine 5 along with the movement of the link mechanisms 11 including the clips 21, and passes through the region 20A (preheating region), the region 20B (stretching region), and the region 20C (heat setting region) in this order. The film 8 is stretched in the MD direction and the TD direction while passing through the region 20B (stretching region). Thereafter, the film 8 reaches the outlet through the region 20C (heat setting region) and is released from the clips 21. The film 8 released from the clips 21 is conveyed to the take-off apparatus 6 and is further conveyed from the take-off apparatus 6 to the winder apparatus 7.

As shown in FIG. 3, in the region 20A (preheating region), the interval (separation distance in the TD direction) L2 between the rails 13 and 14 of the link device 10R and the rails 13 and 14 of the link device 10L is almost constant. Therefore, the stretching process of the film 8 in the TD direction is not performed in the region 20A. Accordingly, the width (dimension in the TD direction) of the conveyed film 8 does not change and remains constant in the region 20A.

Also, in the region 20A, the interval (separation distance) L1 between the rail 13 and the rail 14 of the link device 10R on the film side is almost constant. Therefore, in the region 20A, the pitch P1 of the link mechanisms 11 of the link device 10R on the film side is almost constant, and thus the pitch P2 of the clips 21 of the link device 10R on the film side is also almost constant. Further, in the region 20A, the interval (separation distance) L1 between the rail 13 and the rail 14 of the link device 10L on the film side is almost constant. Therefore, in the region 20A, the pitch P1 of the link mechanisms 11 of the link device 10L on the film side is almost constant, and thus the pitch P2 of the clips 21 of the link device 10L on the film side is also almost constant. As a result, the stretching process of the film 8 in the MD direction is not performed in the region 20A. Namely, the stretching process of the film 8 in the TD direction and the MD direction is not performed in the region 20A.

Next, the operation of the stretching machine 5 in the region 20B will be described. In the region 20B, the interval (interval in the TD direction) between the rails 13 and 14 of the link device 10R and the rails 13 and 14 of the link device 10L gradually increases as advancing in the conveying direction (MD direction). Therefore, in the region 20B, the film 8 is pulled and stretched in the TD direction as it advances in the conveying direction (MD direction). In other words, in the region 20B, the width (dimension in the TD direction) of the film 8 gradually increases as it advances in the conveying direction (MD direction).

Also, in the region 20B, as advancing in the conveying direction (MD direction), the interval (separation distance) L1 between the rail 13 and the rail 14 of the link device 10R on the film side gradually decreases, and the interval (separation distance) L1 between the rail 13 and the rail 14 of the link device 10L on the film side also gradually decreases. Therefore, in the region 20B, the pitch P1 of the link mechanisms 11 of the link device 10R on the film side gradually increases as advancing in the conveying direction (MD direction), and thus the pitch P2 of the clips 21 of the link device 10R on the film side also gradually increases. Further, in the region 20B, the pitch P1 of the link mechanisms 11 of the link device 10L on the film side gradually increases as advancing in the conveying direction (MD direction), and thus the pitch P2 of the clips 21 of the link device 10L on the film side also gradually increases. As a result, in the region 20B, the film 8 is pulled and stretched in the MD direction as it advances in the conveying direction (MD direction).

Accordingly, in the region 20B, the film 8 is stretched in the TD direction and the MD direction as it advances in the conveying direction (MD direction). Namely, in the region 20B, the stretching process in the TD direction and the MD direction is applied to the film 8.

Next, the operation of the stretching machine 5 in the region 20C will be described. The region 20C is a section in which the link mechanisms 11 gripping the film 8 which has been stretched in the region 20B run. Since the rails 13 and 14 provided in the region 20C have slits which will be described in detail later, the rails 13 and 14 are partially bent in the TD direction. Namely, in a part of the region 20C, the interval L2 between the rails 13 and 14 of the link device 10R and the rails 13 and 14 of the link device 10L can be increased or decreased as compared with that in other parts. Therefore, in the region 20C, which is a partial section of the regions 20A, 20B, and 20C, the width (dimension in the TD direction) of the conveyed film 8 is partially changed.

Further, in the region 20C, the interval (separation distance) L1 between the rail 13 and the rail 14 of the link device 10R on the film side is almost constant. Therefore, in the region 20C, the pitch P1 of the link mechanisms 11 of the link device 10R on the film side is almost constant, and thus the pitch P2 of the clips 21 of the link device 10R on the film side is also almost constant. Further, in the region 20C, the interval (separation distance) L1 between the rail 13 and the rail 14 of the link device 10L on the film side is almost constant. Therefore, in the region 20C, the pitch P1 of the link mechanisms 11 of the link device 10L on the film side is almost constant, and thus the pitch P2 of the clips 21 of the link device 10L on the film side is also almost constant. As a result, the stretching process of the film 8 in the MD direction is not performed in the region 20C.

As described above, in the region 20A, the pitch P1 of the link mechanisms 11 of the link device 10R on the film side is kept constant, and the pitch P1 of the link mechanisms 11 of the link device 10L on the film side is also kept constant. Thereafter, in the region 20B, the pitch P1 of the link mechanisms 11 of the link device 10R on the film side and the pitch P1 of the link mechanisms 11 of the link device 10L on the film side are gradually expanded. Then, in the region 20C, the pitch P1 of the link mechanisms 11 of the link device 10R on the film side is kept constant again, and the pitch P1 of the link mechanisms 11 of the link device 10L on the film side is also kept constant again. Therefore, on the film side of each of the link devices 10R and 10L, the pitch P1 of the link mechanisms 11 in the region 20C is larger than the pitch P1 of the link mechanisms 11 in the region 20A. From another viewpoint, on the film side of each of the link devices 10R and 10L, the pitch P2 of the clips 21 in the region 20C is larger than the pitch P2 of the clips 21 in the region 20A. From still another viewpoint, on the film side of each of the link devices 10R and 10L, the separation distance L1 between the rails 13 and 14 in the region 20C is smaller than the separation distance L1 between the rails 13 and 14 in the region 20A.

Configuration of Link Mechanism

Figure 5:
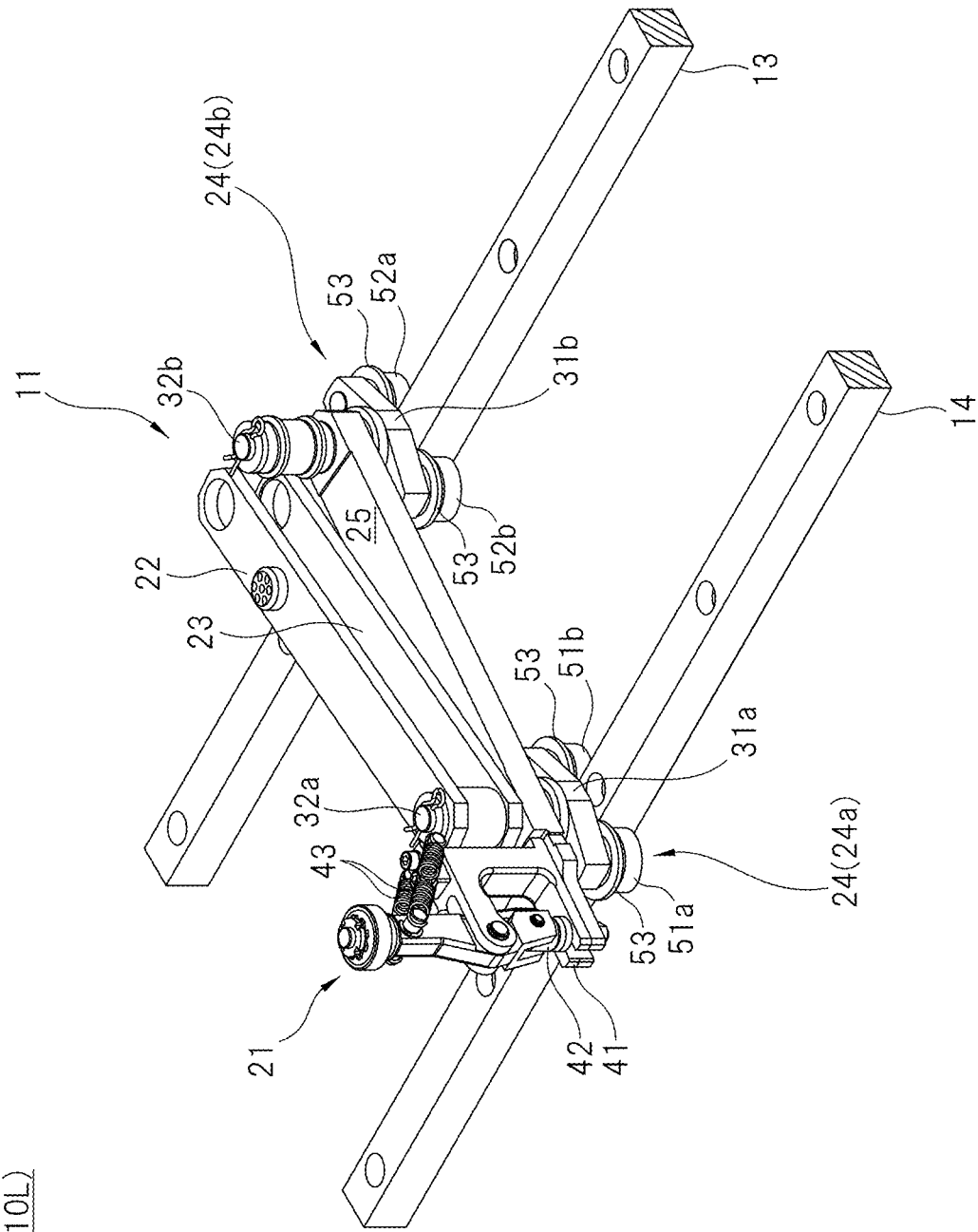
FIG. 5 is a plan view showing one of a plurality of link mechanisms in an enlarged manner.
Figure 6:
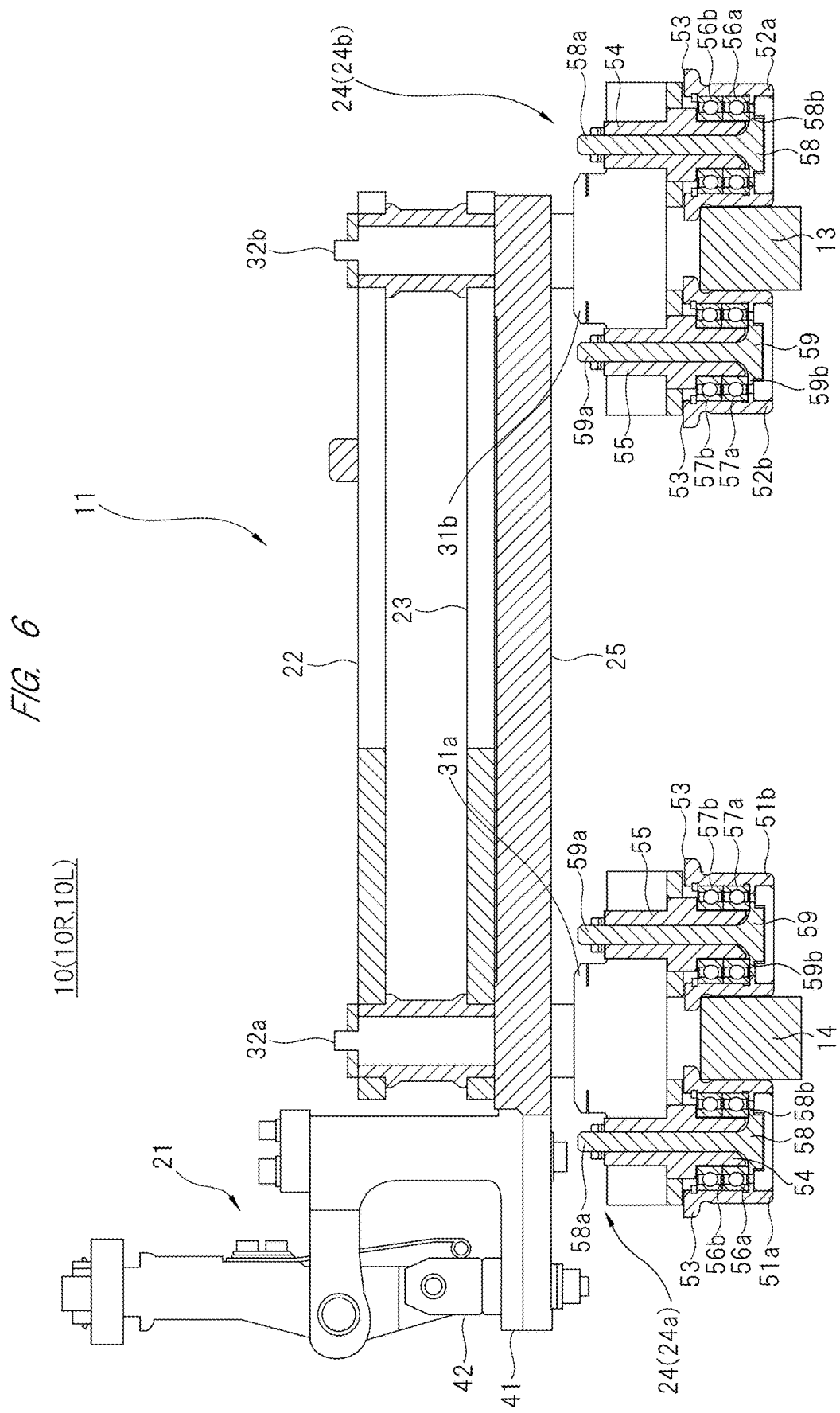
FIG. 6 is a cross-sectional view of the link mechanism.

FIG. 5 is a perspective view showing one of the plurality of link mechanisms shown in FIG. 3 in an enlarged manner. FIG. 6 is a cross-sectional view of the link mechanism shown in FIG. 5.

As shown in FIG. 5 and FIG. 6, each of the link mechanisms 11 in the link devices 10R and 10L includes an upper link plate 22, a lower link plate 23, a pair of rail holders 24a and 24b, and a base member 25 bridging the pair of rail holders 24a and 24b in addition to the clip 21. One rail holder 24a is disposed on the rail 14, and the other rail holder 24b is disposed on the rail 13.

The upper link plate 22 and the lower link plate 23 are plate-shaped members that extend linearly in plan view. The base member 25 is common with the upper link plate 22 and the lower link plate 23 in that the base member 25 extends linearly in plan view, but the base member 25 is thicker than the upper link plate 22 and the lower link plate 23. In the following description, when there is no need to particularly distinguish between the rail holders 24a and 24b, they will be collectively referred to as "rail holders 24".

Rail Holder

The rail holder 24a includes a roller holding portion 31a and a shaft 32a provided at the center of the roller holding portion 31a in the longitudinal direction. The roller holding portion 31a is disposed on the rail 14 so as to straddle the rail 14. Therefore, one end of the roller holding portion 31a disposed on the rail 14 in the longitudinal direction protrudes toward the inner side of the rail 14 (side facing the rail 13), and the other end of the roller holding portion 31a in the longitudinal direction protrudes toward the outer side of the rail 1 (opposite side of the side facing the rail 13). Also, when the roller holding portion 31a is disposed on the rail 14, the shaft 32a is located just above the rail 14.

As shown in FIG. 6, the shaft 32a of the rail holder 24a penetrates one ends of the upper link plate 22, the lower link plate 23, and the base member 25 in the longitudinal direction. A base end of the base member 25, a base end of the upper link plate 22, and a base end of the lower link plate 23 are skewered with the shaft 32a, and are rotatably coupled with each other via the shaft 32a. In other words, the shaft 32a is a rotation axis on the base end side of the upper link plate 22, the lower link plate 23, and the base member 25.

The rail holder 24b includes a roller holding portion 31b and a shaft 32b provided at the center of the roller holding portion 31b in the longitudinal direction. The roller holding portion 31b is disposed on the rail 13 so as to straddle the rail 13. Therefore, one end of the roller holding portion 31b disposed on the rail 13 in the longitudinal direction protrudes toward the inner side of the rail 13 (side facing the rail 14), and the other end of the roller holding portion 31b in the longitudinal direction protrudes toward the outer side of the rail 13 (opposite side of the side facing the rail 14). Also, when the roller holding portion 31b is disposed on the rail 13, the shaft 32b is located just above the rail 13.

The shaft 32b of the rail holder 24b penetrates one end (tip end) of the base member 25 in the longitudinal direction and protrudes from the base member 25. Namely, the tip end of the base member 25 of the link mechanism 11 and tip ends of the upper link plate 22 and the lower link plate 23 of another adjacent link mechanism 11 are rotatably coupled with each other via the shaft 32b of the link mechanism 11. From another viewpoint, the shaft 32b is a rotation axis on the tip end side of the upper link plate 22, the lower link plate 23, and the base member 25.

Clip

The clip 21 is provided at the base end of the base member 25. The clip 21 includes a main body portion 41, a grip portion 42, a spring portion 43, and others. The main body portion 41 is fixed to the base end of the base member 25. The grip portion 42 is attached to the main body portion 41 so as to be operable in an up-down direction. The spring portion 43 biases the grip portion 42 so as to operate the grip portion 42 downward. By making the grip portion 42 operate downward by the biasing force of the spring portion 43, the film 8 is sandwiched between the main body portion 41 and the grip portion 42. Namely, the film 8 is gripped by the clip 21. On the other hand, by making the grip portion 42 operate upward against the biasing force of the spring portion 43, the film 8 is released from the clip 21.

Guide Roller

A pair of guide rollers 51a and 51b facing each other with the rail 14 interposed therebetween are provided in a lower portion of the rail holder 24a, and a pair of guide rollers 52a and 52b facing each other with the rail 13 interposed therebetween are provided in a lower portion of the rail holder 24b. The guide rollers 51a, 51b, 52a, and 52b are made of metal. Each of the guide rollers 51a, 51b, 52a, and 52b has a cylindrical shape with openings at both ends in the axial direction, and a flange 53 protruding in a radially outward direction is integrally formed on one end side (upper portion) in the axial direction.

The flanges 53 of the guide rollers 51a and 51b provided in a lower portion of the rail holder 24a are disposed on the rail 14, and the flanges 53 of the guide rollers 52a and 52b provided in a lower portion of the rail holder 24b are disposed on the rail 13. More specifically, the flange 53 of the guide roller 51a overlaps the outer edge of the upper surface of the rail 14 (on the opposite side of the side facing the rail 13), and the flange 53 of the guide roller 51b overlaps the inner edge of the upper surface of the rail 14 (on the side facing the rail 13). Also, the flange 53 of the guide roller 52a overlaps the outer edge of the upper surface of the rail 13 (on the opposite side of the side facing the rail 14), and the flange 53 of the guide roller 52b overlaps the inner edge of the upper surface of the rail 13 (on the side facing the rail 14). Thus, the entire link mechanism 11 is supported by the rails 13 and 14 via the guide rollers 51a and 51b of the rail holder 24a and the guide rollers 52a and 52b of the rail holder 24b.

In other words, the guide rollers 51a, 51b, 52a, and 52b are support rollers that support the link mechanism 11. More specifically, the guide rollers 51a, 51b, 52a, and 52b are cantilever support rollers that support the link mechanism 11 by means of the flanges 53 provided on one end side (upper portion) in the axial direction. From another viewpoint, the guide rollers 51a, 51b, 52a, and 52b are flanged rollers having the integrally formed flanges 53.

The four guide rollers 51a, 51b, 52a, and 52b have the same shape, structure, dimension, and the like. Therefore, by describing the shape, structure, and the like of the guide rollers 51a and 51b provided in the rail holder 24a in more detail, the shape, structure, and the like of the guide rollers 52a and 52b provided in the rail holder 24b will also be clarified.

As shown in FIG. 6, the roller holding portion 31a of the rail holder 24a is attached to the lower end of the shaft 32a protruding downward from the base member 25 so as to be rotatable about the shaft 32a as a rotation axis. Specifically, the roller holding portion 31a is attached to the lower end of the shaft 32a via bearings.

Figure 7:
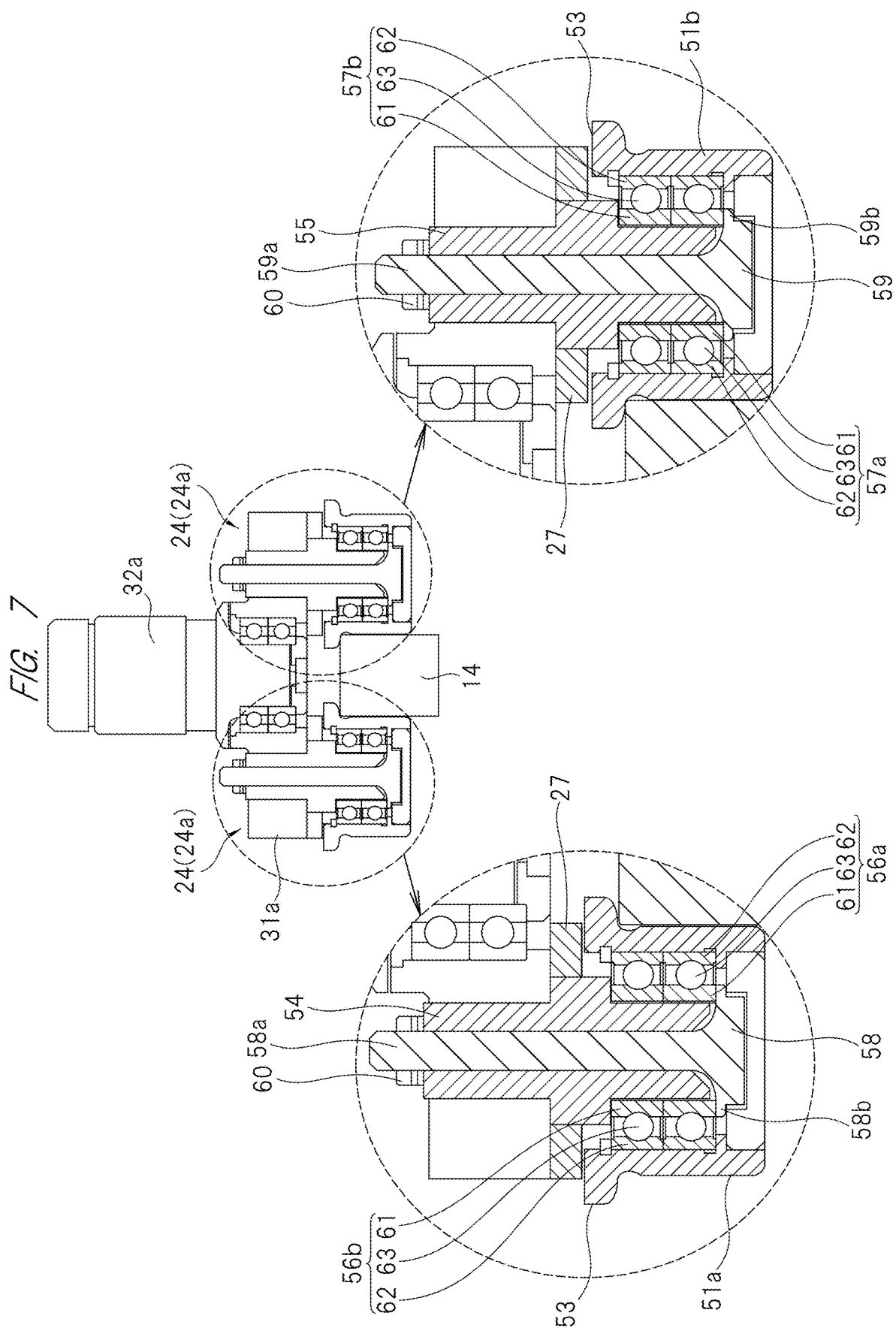
FIG. 7 is a partially enlarged cross-sectional view showing guide rollers and surrounding structures thereof.

FIG. 7 is a partially enlarged cross-sectional view showing the guide rollers 51a and 51b and surrounding structures thereof shown in FIG. 6. As shown in FIG. 7, shafts (hollow shaft 54 and flanged shaft 58) are provided on one end side of the roller holding portion 31a protruding toward the outer side of the rail 14, and other shafts (hollow shaft 55 and flanged shaft 59) are provided on the other end side of the roller holding portion 31a protruding toward the inner side of the rail 14. In the following description, the side close to the rail 14 with respect to the roller holding portion 31a is referred to as a lower side, and the side opposite to the rail 14 with respect to the roller holding portion 31a is referred to as an upper side in some cases.

Hollow Shaft

The hollow shaft 54 is a hollow cylindrical member that extends in an up-down direction. One side (upper portion) of the hollow shaft 54 is press-fitted into a mounting hole provided on one end side of the roller holding portion 31a, and the other side (lower portion) of the hollow shaft 54 protrudes toward the lower side of the roller holding portion 31a. Similarly, one side (upper portion) of the hollow shaft 55 is press-fitted into a mounting hole provided on the other end side of the roller holding portion 31a, and the other side (lower portion) of the hollow shaft 55 protrudes toward the lower side of the roller holding portion 31a. Accordingly, since the hollow shafts 54 and 55 are attached in a state of being fixed to the roller holding portion 31a, the occurrence of detachment of the hollow shafts 54 and 55 due to vibrations applied to the rail holder 24 is suppressed. Namely, the vibration resistance of the hollow shafts 54 and 55 is improved.

Note that the hollow shaft 55 is not limited to that configured to be press-fitted into the roller holding portion 31a. For the attachment of the hollow shaft 55 to the roller holding portion 31a, any attachment method capable of fixing the hollow shaft 55 with vibration resistance can be applied.

Covers 27 are provided on the lower side of the roller holding portion 31a. Openings are formed in the covers 27, and the covers 27 are mounted by inserting lower portions of the hollow shafts 54 and 55 protruding toward the lower side into the openings. The covers 27 are made of, for example, a material such as metal or resin, and are provided to prevent splashed oil or the like from entering bearings 56a, 56b, 57a, and 57b described below when the link mechanism 11 moves (runs) on the rails 13 and 14.

Bearing

The guide roller 51a is attached to the lower portion of the hollow shaft 54 protruding toward the lower side so as to be rotatable on the lower side of the cover 27. Specifically, the other side (lower portion) of the hollow shaft 54 is inserted into the guide roller 51a, and a bearing 56a and a bearing 56b are interposed between the guide roller 51a and the lower portion of the hollow shaft 54. The bearing 56a and the bearing 56b are provided so as to overlap in the axial direction of the hollow shaft 54. Namely, the guide roller 51a is rotatably supported with respect to the hollow shaft 54 by the two bearings 56a and 56b. Since the bearings 56a and 56b overlap in two upper and lower stages, the bearing 56a is referred to as a "lower bearing 56a", and the bearing 56b is referred to as an "upper bearing 56b" in some cases in the following description.

Also, the guide roller 51b is attached to a protruding portion of the hollow shaft 55 protruding toward the lower side so as to be rotatable on the lower side of the cover 27.

The other side (lower portion) of the hollow shaft 55 is inserted into the guide roller 51b, and a bearing 57a and a bearing 57b are interposed between the guide roller 51b and the lower portion of the hollow shaft 55. The bearing 57a and the bearing 57b are provided so as to overlap in the axial direction of the hollow shaft 55. Namely, the guide roller 51b is rotatably supported with respect to the hollow shaft 55 by the two bearings 57a and 57b. Since the bearings 57a and 57b overlap in two upper and lower stages, the bearing 57a is referred to as a "lower bearing 57a", and the bearing 57b is referred to as an "upper bearing 57b" in some cases in the following description.

Each of the bearings 56a and 56b is a rolling bearing (ball bearing) including an inner ring 61, an outer ring 62 surrounding the inner ring 61, and a plurality of rolling elements (balls) 63 disposed between the inner ring 61 and the outer ring 62. A lubricant such as grease is filled in the gap between the inner ring 61 and the outer ring 62. Note that the bearing 57a and the bearing 57b supporting the guide roller 51b are non-contact sealed bearings identical to the bearing 56a and the bearing 56b described above. Namely, the bearing 57a and the bearing 57b each include the inner ring 61, the outer ring 62, and the rolling elements (balls) 63, and a lubricant such as grease is filled between the inner ring 61 and the outer ring 62.

Flanged Shaft

The flanged shaft 58 includes a shaft portion 58a and a flange portion 58b. The shaft portion 58a extends along the axial direction (up-down direction) of the hollow shaft 54 and is inserted into the hollow shaft 54 from the lower side. A part (upper portion) of the shaft portion 58a protrudes toward an upper side of the hollow shaft 54. The flanged shaft 58 is fixed to the hollow shaft 54 by a retaining member 60 such as a nut via an anti-loosening member such as a washer at the protruding upper portion of the shaft portion 58a.

The flanged shaft 59 includes a shaft portion 59a and a flange portion 59b. The shaft portion 59a extends along the axial direction (up-down direction) of the hollow shaft 55 and is inserted into the hollow shaft 55 from the lower side. A part (upper portion) of the shaft portion 59a protrudes toward an upper side of the hollow shaft 55. The flanged shaft 59 is fixed to the hollow shaft 55 by a retaining member 60 such as a nut via an anti-loosening member such as a washer at the protruding upper portion of the shaft portion 59a.

As described above, the hollow shafts 54 and 55 are attached to the roller holding portion 31a with improved vibration resistance. Therefore, the vibration resistance of the flanged shafts 58 and 59 fixed to the hollow shafts 54 and 55 is also improved similarly.

The flange portion 58b is formed on a lower side of the shaft portion 58a. The flange portion 58b is a support portion that supports the lower bearing 56a interposed between the hollow shaft 54 and the guide roller 51a from the lower side. Specifically, the flange portion 58b is in contact with a lower side of the inner ring 61 of the lower bearing 56a to support the lower bearing 56a from the lower side. The flange portion 59b of the flanged shaft 59 is formed on the lower side of the shaft portion 59a. Similarly to the flange portion 58b, the flange portion 59b is a support portion that supports the lower bearing 57a interposed between the hollow shaft 55 and the guide roller 51b from the lower side. Specifically, the flange portion 59b is in contact with a lower side of the inner ring 61 of the lower bearing 57a to support the lower bearing 57a from the lower side.

In this way, the flanged shafts 58 and 59 can support the guide rollers 51a and 51b without interfering with the rotation of the guide rollers 51a and 51b.

When the rail holder 24 moves on the rail 14, the guide roller 51a moves along an outer side surface of the rail 14 while rotating. When the rail holder 24 moves on the rail 14, the guide roller 51b moves along an inner side surface of the rail 14 while rotating. Similarly, when the rail holder 24 moves on the rail 13, the guide roller 52a moves along an outer side surface of the rail 13 while rotating. When the rail holder 24 moves on the rail 13, the guide roller 52b moves along an inner side surface of the rail 13 while rotating.

Rail for Stretching Machine

Figure 8A:
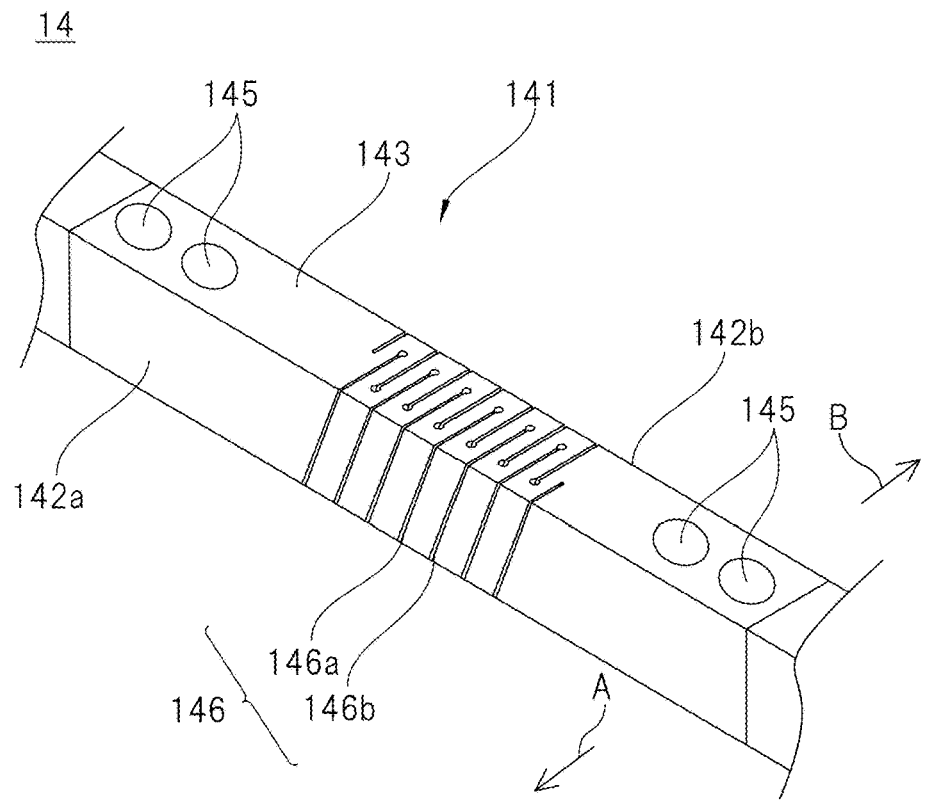
FIG. 8A is an external perspective view of the rail.
Figure 8B:
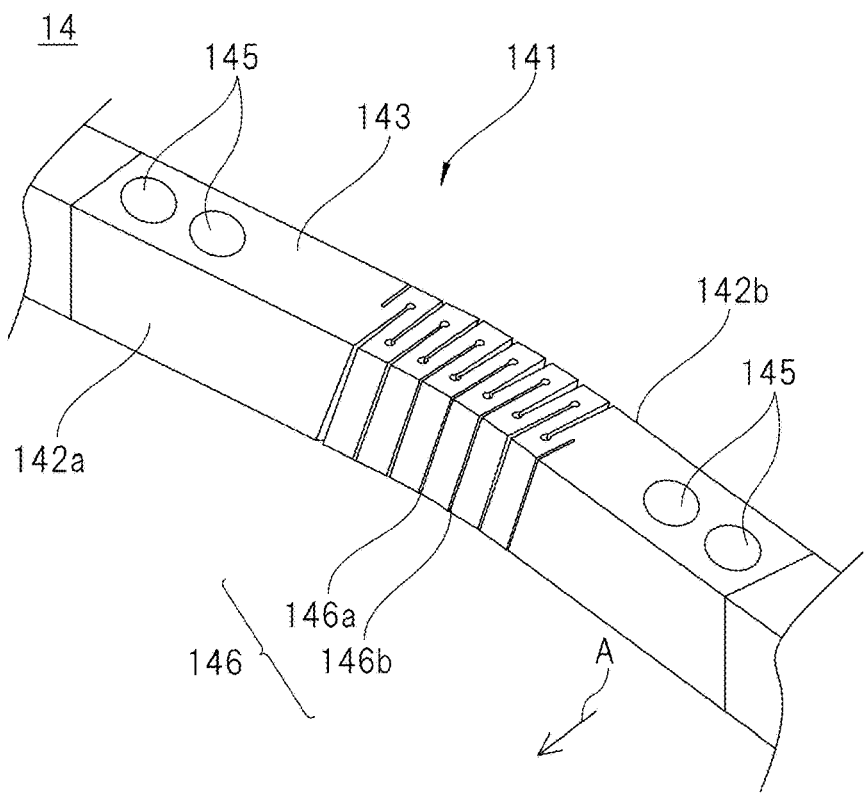
FIG. 8B is an external perspective view of the rail.

The rail for the stretching machine on which the link mechanism 11 described above moves (runs) will be described in detail. FIG. 8A and FIG. 8B are external perspective views of a part of the rail 14 provided in the region 20C, and FIG. 9 is a side view of the rail 14. Hereinafter, the rail 14 will be described as the rail for the stretching machine. However, since the rail 13 also has the similar structure to the rail 14, the descriptions made for the rail 14 are also applied to the rail 13.

As shown in FIG. 8A, FIG. 8B, and FIG. 9, the rail 14 is made up of a plurality of partial rails 141 connected to each other. The partial rail 141 has an upper surface 143 that faces the link mechanism 11 and side surfaces 142a and 142b that are parallel to a plane perpendicular to the upper surface 143. The upper surface 143 and the side surfaces 142a and 142b are surfaces whose longitudinal direction is the direction in which the partial rail 141 extends (extending direction). Each partial rail 141 is fixed to the support table (bed) 140 by bolts 145 inserted from above into the upper surface 143 at its both ends in the direction in which the rail for the stretching machine extends.

The partial rail 141 has a plurality of slits 146 formed in a staggered pattern at intervals in its longitudinal direction (the direction in which the partial rail 141 extends) in one side surface 142a and the other side surface 142b. The slits 146 extend from the upper surface 143 to a surface (lower surface) 144 facing the support table 140 in a direction inclined with respect to the direction in which the partial rail 141 extends (extending direction). Note that the number of slits 146 is not limited to the that shown in FIG. 8A, FIG. 8B, and FIG. 9.

By forming the plurality of slits 146, the partial rail 141 is configured to be bendable and deformable in the TD direction. Specifically, when the bed 140 supporting the partial rail 141 is moved at one end of the partial rail 141 in the direction of an arrow A in FIG. 8A, the partial rail 141 bends following the movement of the bed 140 as shown in FIG. 8B. The partial rail 141 is fixed to the support table 140 by the bolts 145 at both ends in the extending direction. Therefore, the partial rail 141 bends in the direction intersecting the extending direction near the center of the partial rail 141 in the extending direction (that is, the portion where the slits 146 are formed), and one end of the partial rail 141 is moved in the direction of the arrow A in FIG. 8B. Note that, when the bed 140 is moved along an arrow B which is the opposite direction to the arrow A, the central portion of the partial rail 141 bends in the opposite direction to that in the shape shown in FIG. 8B following the movement of the bed 140. As described above, since the partial rail 141 bends following the movement of the bed 140, it is possible to change the distance between the rail 14 on the film side of the link device 10L and the rail 14 on the film side of the link device 10R, that is, the distance in the TD direction.

The width of the slit 146 is set such that the generation of vibrations caused by the running of the guide roller 51a can be suppressed as described below and the partial rail 141 can be bent as described above. In this case, the width of the slit 146 is, for example, smaller than 2 mm, and preferably 1 mm or less. Furthermore, the interval between the adjacent slits 146 (for example, slit 146a and slit 146b in FIG. 8A, FIG. 8B, and FIG. 9) of the plurality of slits 146 is, for example, 10 mm or less.

As described above, each slit 146 extends in a direction inclined with respect to the direction in which the partial rail 141 extends. In other words, each slit 146 is formed in the side surfaces 142a and 142b so as to be inclined with respect to the up-down direction, that is, the direction in which the hollow shaft 55 which is the rotation axis of the guide roller 51a extends. Namely, the slits 146 extend in the side surfaces 142a and 142b in non-parallel to the direction in which the rotation axis of the guide roller 51a extends. Specifically, an angle (hereinafter, referred to also as an inclination angle) $\theta$ between the direction perpendicular to the rotation axis of the guide roller 51a (that is, the direction in which the partial rail 141 extends) and the slit 146 is within the range of 45° or more and 70° or less.

By forming the slits 146 with the inclination angle $\theta$ as described above, the generation of vibrations when the guide roller 51a passes on the rail 14 is suppressed. This will be described in detail below.

Figure 10A:
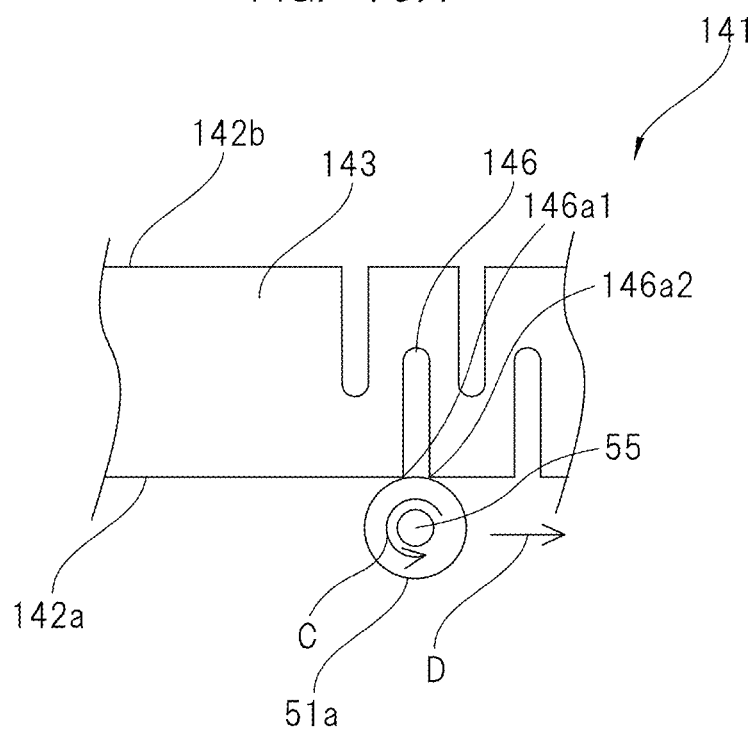
FIG. 10A is a plan view of a rail and a guide roller of a comparative example.
Figure 10B:
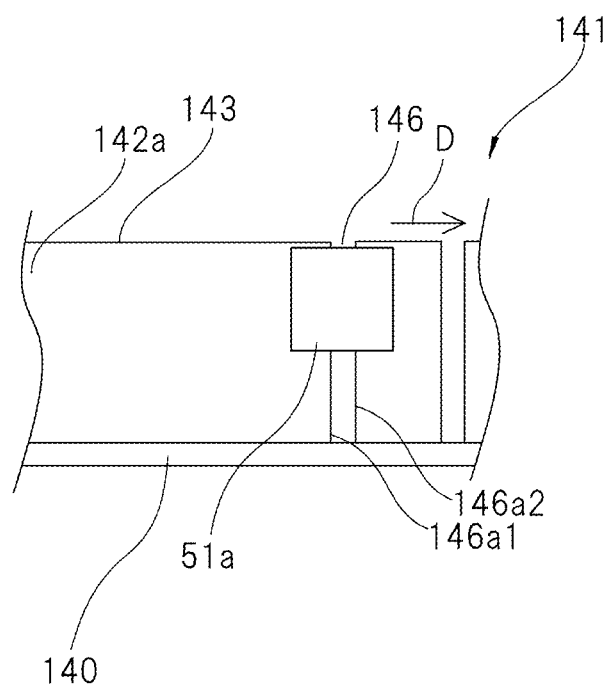
FIG. 10B is a side view of the rail and the guide roller of the comparative example.
Figure 11A:
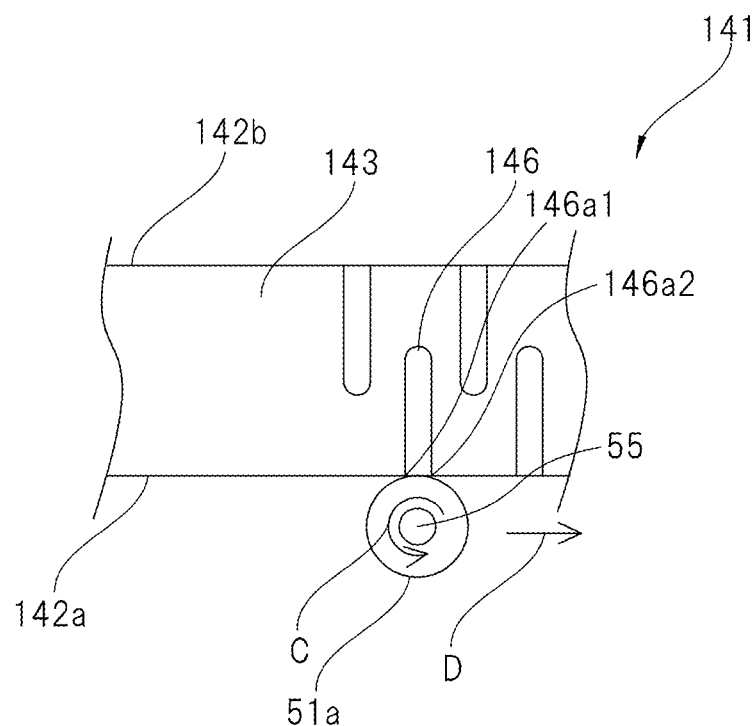
FIG. 11A is a plan view of a rail and a guide roller of an embodiment.

FIG. 10A is a plan view of the rail 14 and the guide roller 51a of a comparative example seen from above, and FIG. 10B is a side view of the rail 14 and the guide roller 51a shown in FIG. 10A. In this comparative example, the slits 146 are not formed so as to have the inclination angle $\theta$, but are perpendicular to the direction in which the rail 14 extends. FIG. 11A is a plan view of the rail 14 and the guide roller 51a of this embodiment seen from above in which the slits 146 are formed so as to have the inclination angle $\theta$, and FIG. 11B is a side view of the rail 14 and the guide roller 51a shown in FIG. 11A on the side of the side surface 142a.

As shown in FIG. 10A and FIG. 10B, the guide roller 51a moves in the direction indicated by an arrow D while rotating in the direction indicated by an arrow C about the hollow shaft 55 which is the rotation axis. In this comparative example, the direction in which the rotation axis of the guide roller 51a extends is parallel to the direction in which the slits 146 are formed. Therefore, when the guide roller 51a reaches the slit 146, the guide roller 51a falls into the slit 146 at an edge portion 146a1 of the slit 146. When the guide roller 51a further advances along the arrow D, it collides with an edge portion 146a2 of the slit 146, and then passes over this edge portion 146a2 to advance further along the arrow D. Namely, when the guide roller 51a passes over the slit 146, vibrations occur because it runs over the step at the edge portion 146a2.

Figure 11B:
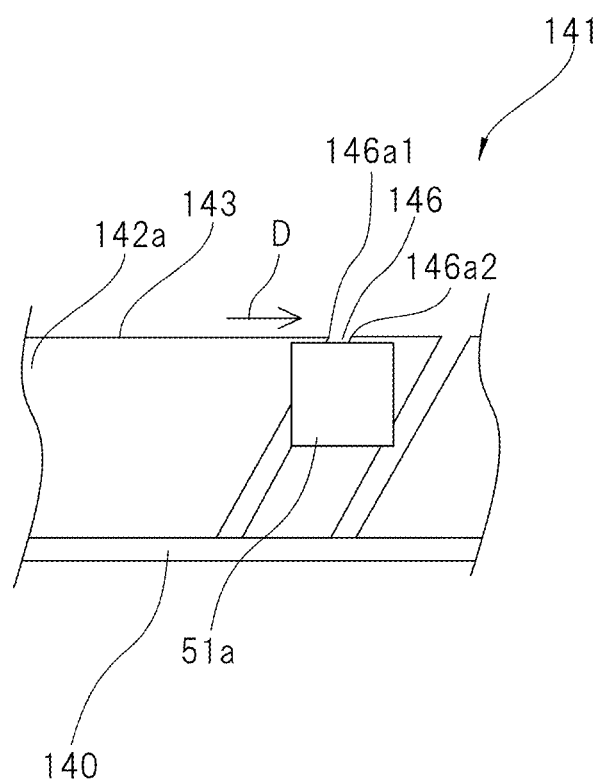
FIG. 11B is a side view of the rail and the guide roller of the embodiment.

In contrast, in the case of the rail 14 of this embodiment shown in FIG. 11A and FIG. 11B, the slits 146 are formed so as to have the inclination angle $\theta$ as described above. Namely, the direction in which the slits 146 extend is inclined with respect to the direction in which the rail 14 extends. In other words, the slits 146 are inclined with respect to the moving direction of the guide roller 51a. Therefore, as shown in FIG. 11B, even when a part (upper part) of the guide roller 51a reaches the slit 146, another part (lower part) of the guide roller 51a is in contact with the side surface 142a of the rail 14. Therefore, unlike the comparative example, the guide roller 51a can advance in the direction of the arrow C without once falling into the slit 146 and then running over the edge portion 146a2. Since the guide roller 51a can move without running over the edge portion 146a2, the generation of vibrations that occur when running over the edge portion 146a2 is suppressed.

The inclination angle $\theta$ of the slit 146 is set within the range of 45° or more and 70° or less as described above. When the inclination angle $\theta$ exceeds 70°, the hollow shaft 55 of the guide roller 51a and the slit 146 become close to parallel though they are not parallel. In this case, as in the comparative example shown in FIG. 10A and FIG. 10B, there is a possibility that the guide roller 51a may fall into the slit 146 to generate vibrations.

Furthermore, if the inclination angle $\theta$ is less than 45°, there is a possibility that twisting may occur when the partial rail 141 is bent.

Figure 12:
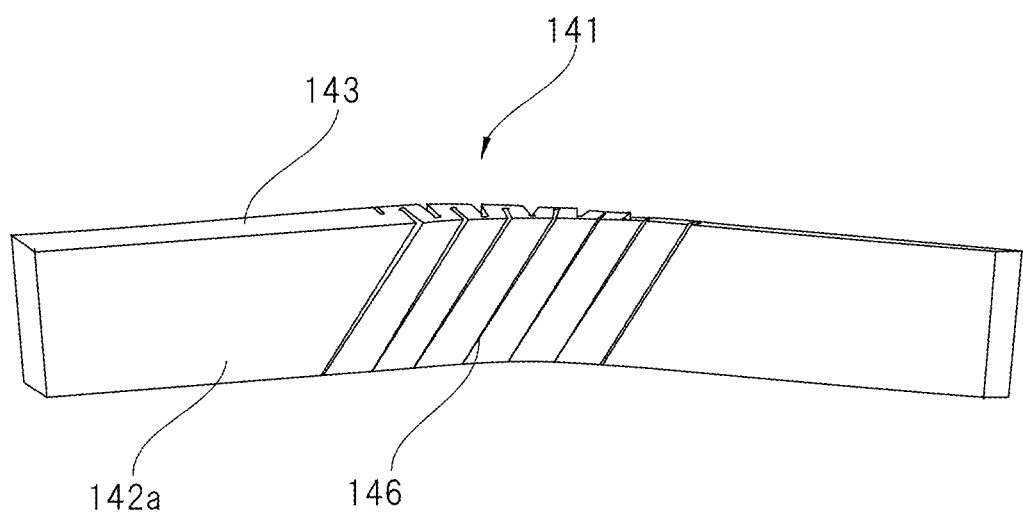
FIG. 12 is a side view showing a state where the rail of the comparative example is bent.

FIG. 12 is a side view of the partial rail 141 when the partial rail 141 with the inclination angle $\theta$ of less than 45° is bent. As shown in FIG. 12, twisting occurs in the bent partial rail 141. As a result, the upper surface 143 of the partial rail 141 will no longer be a uniform surface, so that the smooth movement of the guide roller 51a becomes difficult and the high speed movement of the link mechanism 11 may be hindered.

In this embodiment, 146 having the inclination angle $\theta$ set within the range of 45° to 70° is formed in the side surface 142a of the partial rail 141, the generation of vibrations when the guide roller 51a passes over the slit 146 is suppressed. Note that the slit 146 formed in the side surface 142b also has the same inclination angle $\theta$ as that of the slit 146 formed in the side surface 142a described above. Therefore, the generation of vibrations when the guide roller 51b passes over the slit 146 is also suppressed. In addition, since the generation of vibrations when the guide rollers 51a and 51b pass over the slits 146 is suppressed, the influence due to the vibrations on the components (peripheral machines) arranged around the guide rollers 51a and 51b is suppressed, and the life of the peripheral machines can be extended. In this way, since the generation of vibrations caused by the running of the guide rollers 51a and 51b and the influences on the peripheral machines due to the vibrations are suppressed, the high speed movement of the link mechanism 11 can be achieved. Furthermore, since the link mechanism 11 can be moved at high speed, the time required for producing the film 8 can be shortened, which can contribute to improving the productivity of the film 8.

Note that the present invention is not limited to the case where the slits 146 are formed only in the partial rails 141 provided in the region 20C, which is a partial section of the regions 20A, 20B, and 20C. The partial rails 141 provided in the other region 20A or region 20B may also have the slits 146, or the partial rails 141 provided in all of the regions 20A, 20B, and 20C may have the slits 146. In other words, it is only necessary that the slits 146 are formed at least in the partial rails 141 in a partial section.

In the foregoing, the invention made by the inventors of this application has been specifically described based on the embodiment. However, it is needless to say that the present invention is not limited to the embodiment or example described above and various modifications can be made within the range not departing from the gist of the present invention. For example, the guide rollers in each link mechanism 11 are not limited to flanged rollers. Also, the bearings supporting the guide rollers are not limited to the non-contact ball bearings, and may be, for example, contact sealed bearings.

REFERENCE SIGNS LIST 1 thin-film manufacturing system
2 extrusion apparatus (extruder, kneading extruder)
2a material supply unit (material supply port, hopper)
3 T-die
4 raw sheet cooling apparatus
5 stretching machine
6 take-off apparatus
7 winder apparatus
8 film
9 heat treatment unit
10, 10R, 10L link device
11 link mechanism
13, 14 rail
15, 16, 17 sprocket
20A, 20B, 20C region
21 clip
22 upper link plate
23 lower link plate
24, 24a, 24b rail holder
25 base member
31a, 31b roller holding portion
41 main body portion
42 grip portion
43 spring portion
51a, 51b, 52a, 52b guide roller
53 flange
54, 55 hollow shaft
56a, 57a bearing (lower bearing)
56b, 57b bearing (upper bearing)
58, 59 flanged shaft
58a, 59a shaft portion
58b, 59b flange portion
60 retaining member
61 inner ring
62 outer ring
63 rolling element (ball)
140 support table (bed)
141 partial rail
142a, 142b side surface
143 upper surface
145 bolt
146, 146a, 146b slit

The invention claimed is:

1. A stretching machine configured to stretch a resin film, the stretching machine comprising:
a plurality of link mechanisms coupled to constitute an endless chain; and
a rail on which the link mechanisms run,
wherein the rail has a slit in a side surface, and
wherein the slit extends in a direction inclined with respect to a direction in which the rail extends.

2. The stretching machine according to claim 1,
wherein the direction in which the slit extends in the side surface is not parallel to a rotation axis of a guide roller in the link mechanism.

3. The stretching machine according to claim 1,
wherein an angle formed by the slit with respect to the direction in which the rail extends is within a range of 45° or more and 70° or less.

4. The stretching machine according to claim 3,
wherein a width of the slit is 2 mm or less.

5. The stretching machine according to claim 4,
wherein the rail has a plurality of the slits, and
wherein a distance between the adjacent slits is 10 mm or less.

6. The stretching machine according to claim 1,
wherein the rail includes a plurality of partial rails, and
wherein the slit is formed in the partial rail in at least a partial section of the rail.

7. The stretching machine according to claim 6,
wherein the partial section is a section in which the link mechanism gripping a stretched resin film runs.

8. A rail for a stretching machine on which a link mechanism of a stretching machine configured to stretch a resin film runs, the rail comprising a slit in a side surface,
wherein the slit extends in a direction inclined with respect to a direction in which the rail for the stretching machine extends.

9. The rail for the stretching machine according to claim 8,
wherein the direction in which the slit extends in the side surface is not parallel to a rotation axis of a guide roller in the link mechanism.

10. The rail for the stretching machine according to claim 8,
wherein an angle formed by the slit with respect to the direction in which the rail for the stretching machine extends is within a range of 45° or more and 70° or less.

11. The rail for the stretching machine according to claim 10,
wherein a width of the slit is 2 mm or less.

12. The rail for the stretching machine according to claim 11, comprising a plurality of the slits,
wherein a distance between the adjacent slits is 10 mm or less.

13. The rail for the stretching machine according to claim 8, comprising a plurality of partial rails,
wherein the slit is formed in the partial rail in at least a partial section.

14. The rail for the stretching machine according to claim 13,
wherein the partial section is a section in which the link mechanism gripping a stretched resin film runs.

* * * * *